(12) United States Patent
Benedetti

(10) Patent No.: US 9,333,696 B2
(45) Date of Patent: May 10, 2016

(54) PLATE AND APPARATUS FOR FORMING A PLASTIC MATERIAL FLANGED HOLLOW ARTICLE

(75) Inventor: Giulio Benedetti, Solbiate Arno (IT)

(73) Assignee: Cryovac, Inc., Duncan, SC (US)

( * ) Notice: Subject to any disclaimer, the term of this patent is extended or adjusted under 35 U.S.C. 154(b) by 204 days.

(21) Appl. No.: 13/700,764

(22) PCT Filed: Jun. 1, 2011

(86) PCT No.: PCT/EP2011/059044
§ 371 (c)(1),
(2), (4) Date: Nov. 29, 2012

(87) PCT Pub. No.: WO2011/151374
PCT Pub. Date: Dec. 8, 2011

(65) Prior Publication Data
US 2013/0078334 A1 Mar. 28, 2013

(30) Foreign Application Priority Data
Jun. 3, 2010 (EP) .................................. 10164837

(51) Int. Cl.
*B29C 51/10* (2006.01)
*B29C 51/26* (2006.01)
(Continued)

(52) U.S. Cl.
CPC ............. *B29C 49/30* (2013.01); *B29C 51/18* (2013.01); *B29C 51/22* (2013.01); *B29C 51/262* (2013.01); *B29C 51/306* (2013.01); *B29C 51/42* (2013.01); *B29C 51/428* (2013.01); *B29C 51/10* (2013.01); *B29C 51/225* (2013.01); *B29C 51/261* (2013.01); *B29C 51/325* (2013.01); *B29C 51/425* (2013.01); *B29C 2791/007* (2013.01); *B29K 2025/06* (2013.01); *B29K 2067/003* (2013.01); *B29K 2077/00* (2013.01); *B29K 2233/12* (2013.01); *B29K 2267/046* (2013.01)

(58) Field of Classification Search
USPC ................ 425/182, 183, 195, 387.1, 388
See application file for complete search history.

(56) References Cited

U.S. PATENT DOCUMENTS 3,502,310 A 3/1970 Coffman
3,538,997 A 11/1970 Christine et al.
(Continued)

FOREIGN PATENT DOCUMENTS

DE 3226841 A1 2/1984
EP 2103414 A1 * 9/2009
(Continued)

*Primary Examiner* — Robert B Davis
(74) *Attorney, Agent, or Firm* — Daniel B. Ruble

(57) ABSTRACT

It is disclosed a plate for a mould station to form a flanged hollow plastic container by shaping a flat billet, the plate comprising a base, a frame, an outer core to form a container of a first size and an inner core to form a container of a second size, smaller than the first size, wherein the frame is integral with the base and wherein the frame defines a frame upper surface; wherein the outer core, in a first configuration, is held elastically with its upper surface flush with the frame upper surface and, in a second molding configuration, is held with its upper surface recessed with respect to the frame upper surface; wherein the inner core, in a first configuration, is held elastically with its upper surface flush with the frame upper surface and, in a second molding configuration, is held with its upper surface recessed with respect to the frame upper surface; and wherein a retention system is provided to retain said billet substantially adhering to at least the upper surface of the inner core.

15 Claims, 16 Drawing Sheets

(51) Int. Cl.
  *B29C 49/30* (2006.01)
  *B29C 51/18* (2006.01)
  *B29C 51/42* (2006.01)
  *B29C 51/22* (2006.01)
  *B29C 51/30* (2006.01)
  *B29K 25/00* (2006.01)
  *B29K 67/00* (2006.01)
  *B29K 77/00* (2006.01)
  *B29C 51/32* (2006.01)

(56) References Cited

U.S. PATENT DOCUMENTS

| | | | |
|---|---|---|---|
| 3,546,746 A | 12/1970 | Johnson | |
| 3,669,594 A | 6/1972 | Brown et al. | |
| 3,775,932 A * | 12/1973 | Jeney | 53/433 |
| 3,947,204 A | 3/1976 | Ayres et al. | |
| 4,005,967 A | 2/1977 | Ayres et al. | |
| 4,340,557 A | 7/1982 | Gross | |
| 4,352,766 A | 10/1982 | Bradley et al. | |
| 4,563,325 A | 1/1986 | Coffman | |
| 4,619,806 A | 10/1986 | Gunn | |
| 4,661,409 A | 4/1987 | Kieser et al. | |
| 4,695,243 A | 9/1987 | Watanabe et al. | |
| 4,756,964 A | 7/1988 | Kincaid et al. | |
| 4,836,764 A | 6/1989 | Parkinson | |
| 4,921,647 A | 5/1990 | Stewart | |
| 4,960,556 A | 10/1990 | Oehlenschlaeger et al. | |
| 4,997,691 A | 3/1991 | Parkinson | |
| 5,035,600 A | 7/1991 | Voss | |
| 5,041,303 A | 8/1991 | Wertheimer et al. | |
| 5,091,231 A | 2/1992 | Parkinson | |
| 5,158,786 A | 10/1992 | Reil et al. | |
| 5,251,366 A | 10/1993 | Reil et al. | |
| 5,429,777 A | 7/1995 | Nilsson | |
| 5,472,660 A | 12/1995 | Fortin | |
| 5,500,302 A | 3/1996 | Phillips et al. | |
| 5,565,248 A | 10/1996 | Plester et al. | |
| 5,593,700 A * | 1/1997 | Stilgenbauer | 425/3 |
| 5,672,383 A | 9/1997 | Wagner, Jr. et al. | |
| 5,683,648 A | 11/1997 | Fortin | |
| 5,885,672 A | 3/1999 | Phillips et al. | |
| 5,894,041 A | 4/1999 | Cornell | |
| 6,093,364 A | 7/2000 | Fortin | |
| 6,093,462 A | 7/2000 | O'Herron et al. | |
| 6,324,819 B1 | 12/2001 | Kourtoglou | |
| 6,461,699 B1 | 10/2002 | Slat et al. | |
| 6,555,047 B1 | 4/2003 | Fortin | |
| 6,682,676 B1 | 1/2004 | Renault et al. | |
| 6,808,820 B2 | 10/2004 | Lee et al. | |
| 6,896,506 B1 | 5/2005 | Jordan | |
| 6,919,114 B1 | 7/2005 | Darras et al. | |
| 7,393,202 B1 * | 7/2008 | Slutsky et al. | 425/388 |
| 7,481,640 B1 | 1/2009 | Jordan | |
| 2004/0031798 A1 | 2/2004 | Fox et al. | |
| 2005/0242101 A1 | 11/2005 | Skalitsky | |
| 2006/0293436 A1 | 12/2006 | McNeill | |
| 2007/0045321 A1 | 3/2007 | Fox et al. | |
| 2008/0023870 A1 | 1/2008 | Jordan | |
| 2009/0232923 A1 | 9/2009 | Moretti | |

FOREIGN PATENT DOCUMENTS

| | | | |
|---|---|---|---|
| GB | 2255524 A * | 11/1992 | |
| JP | 60-190328 | 9/1985 | |
| NL | 8501418 | 12/1986 | |
| WO | 2004106162 A3 | 12/2004 | |

* cited by examiner

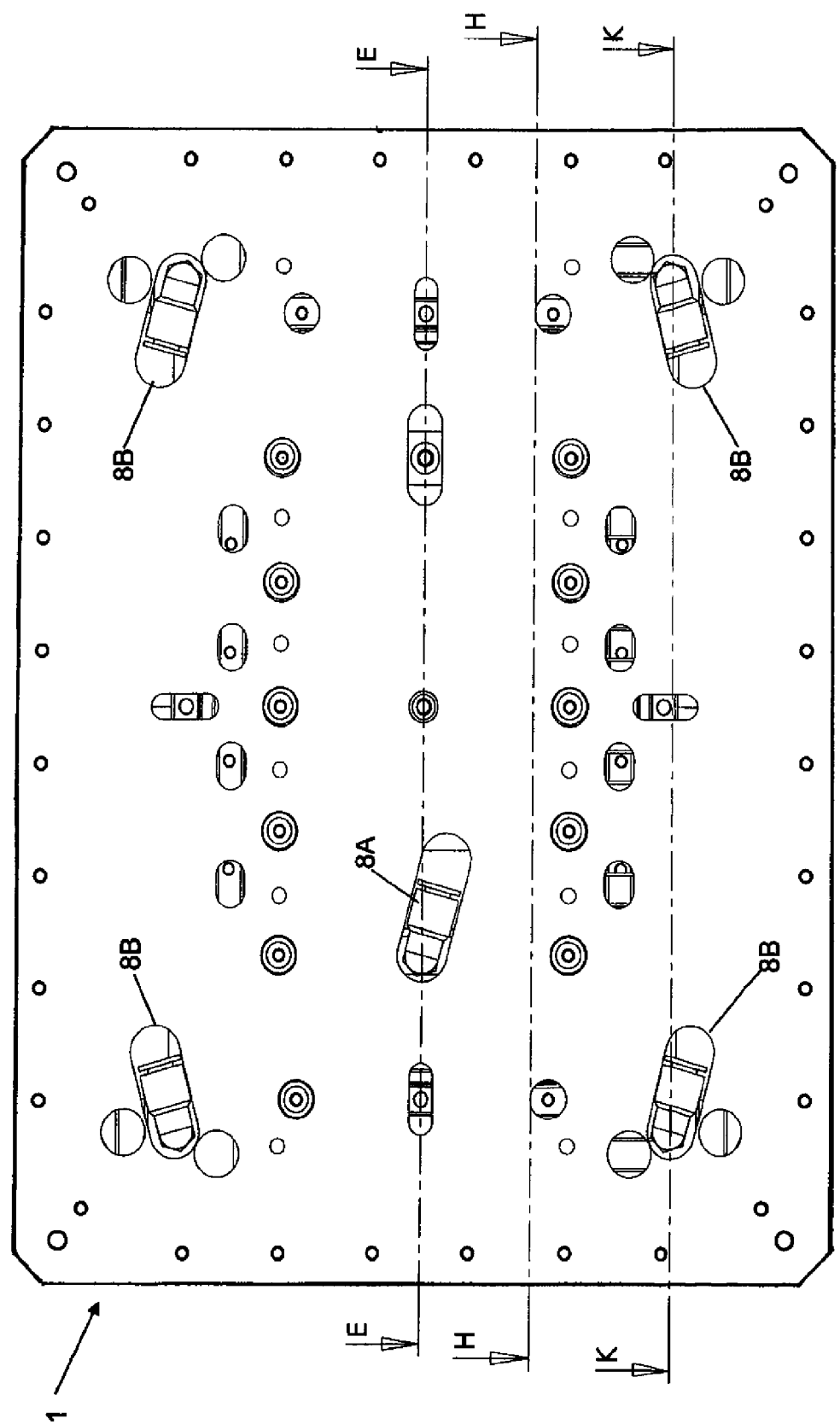

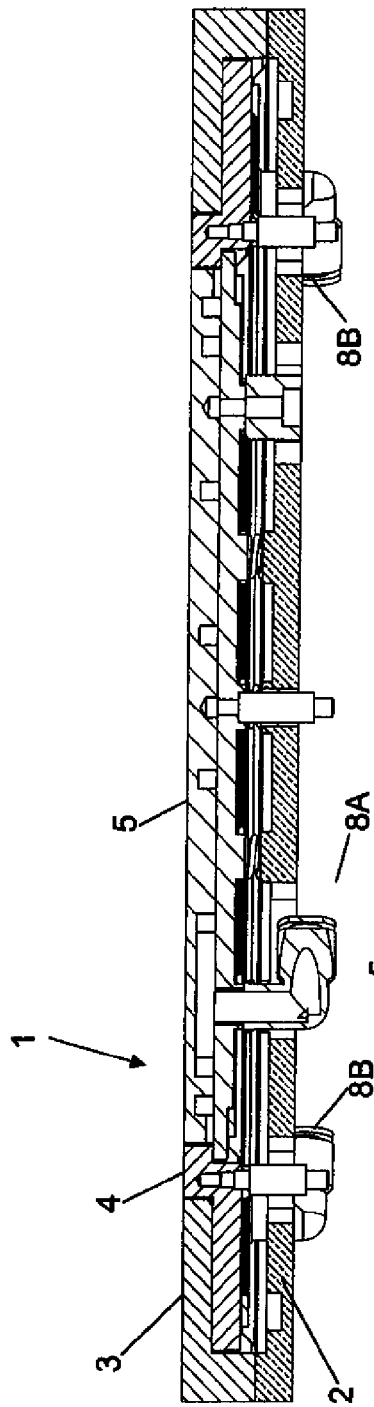
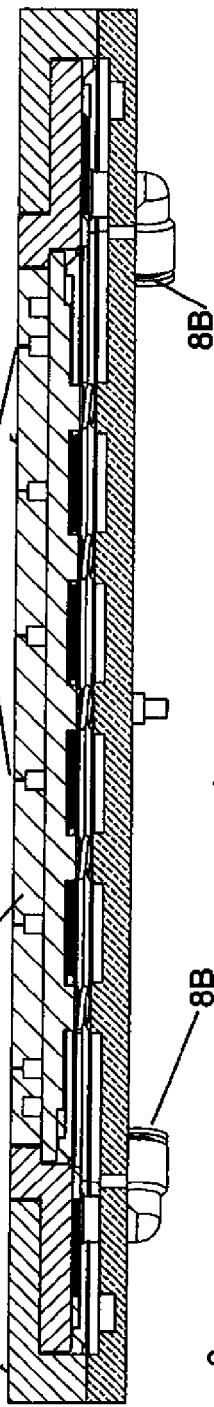
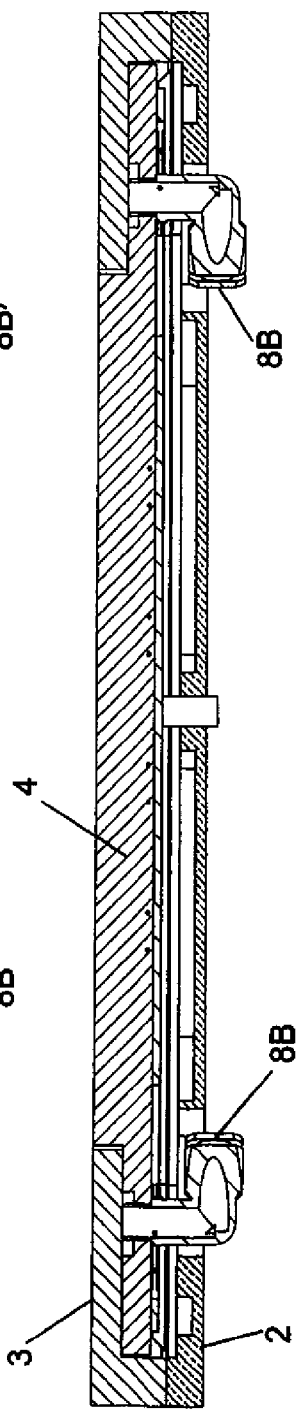
Fig. 1.2
Fig. 1.3
Fig. 1.4

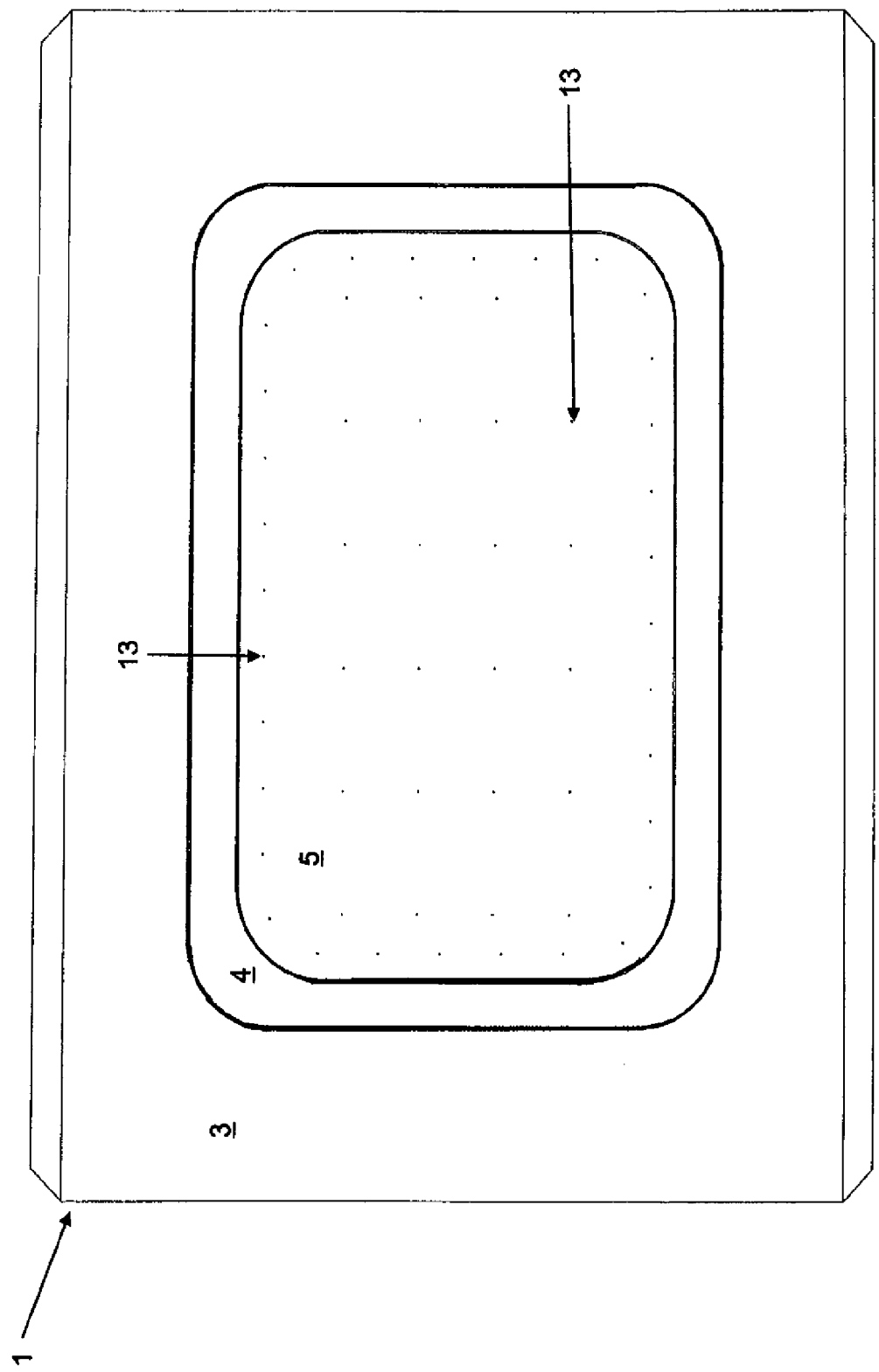
Fig. 1.5.A

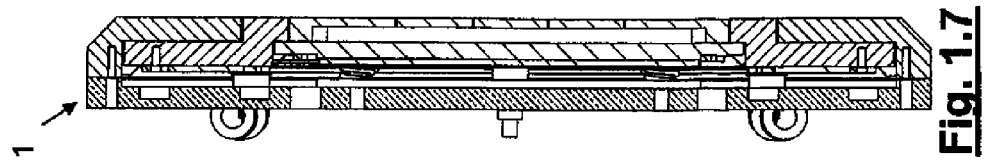
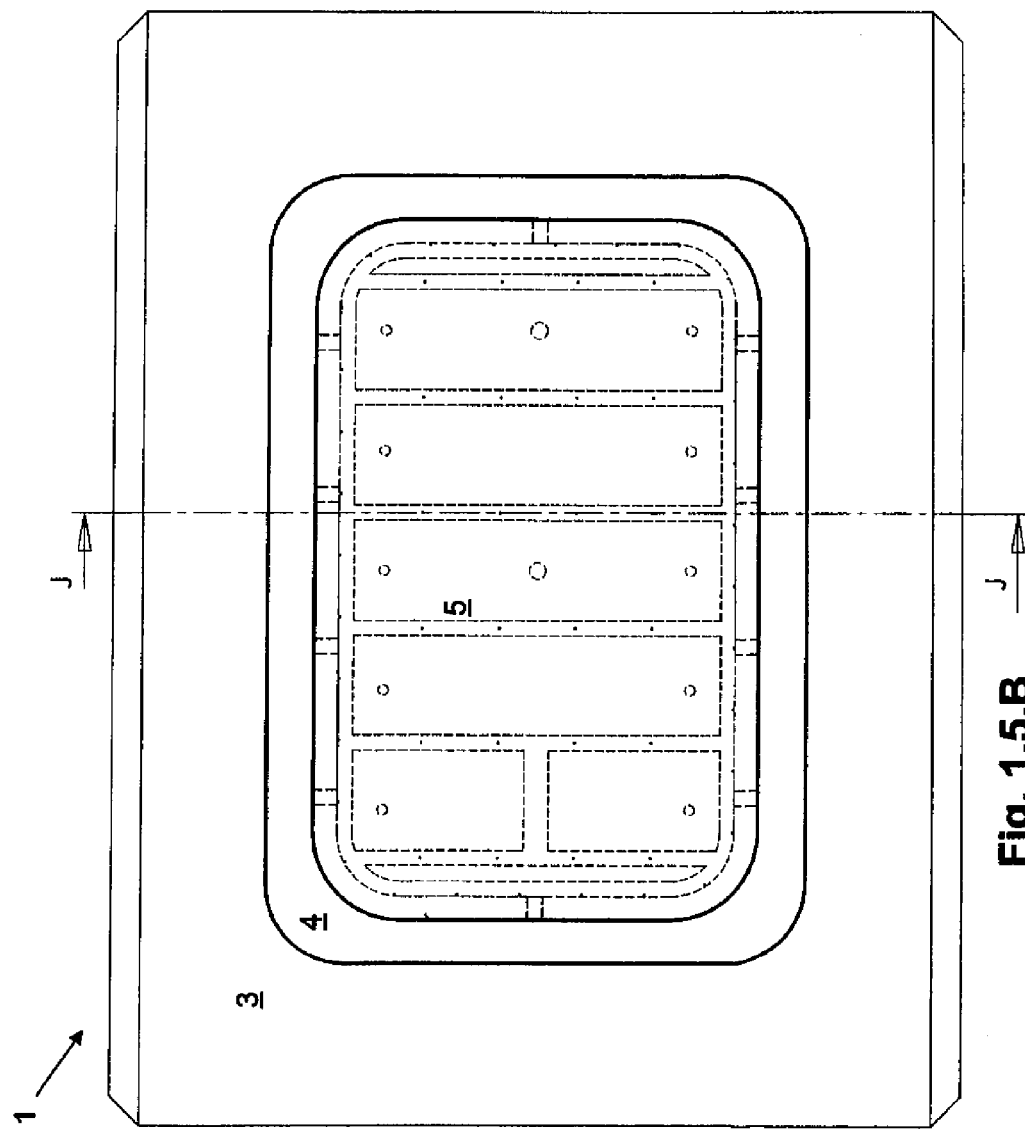

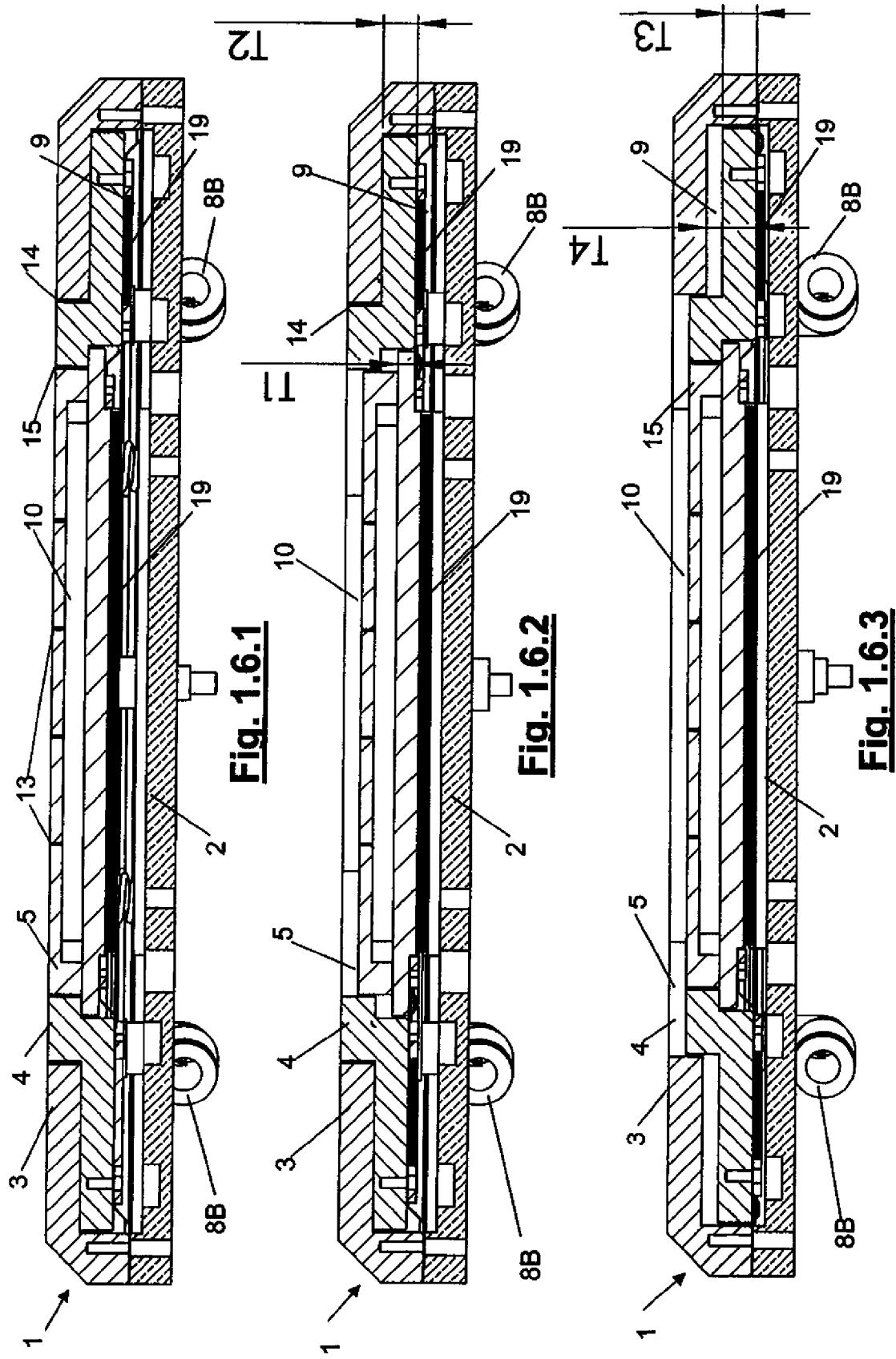

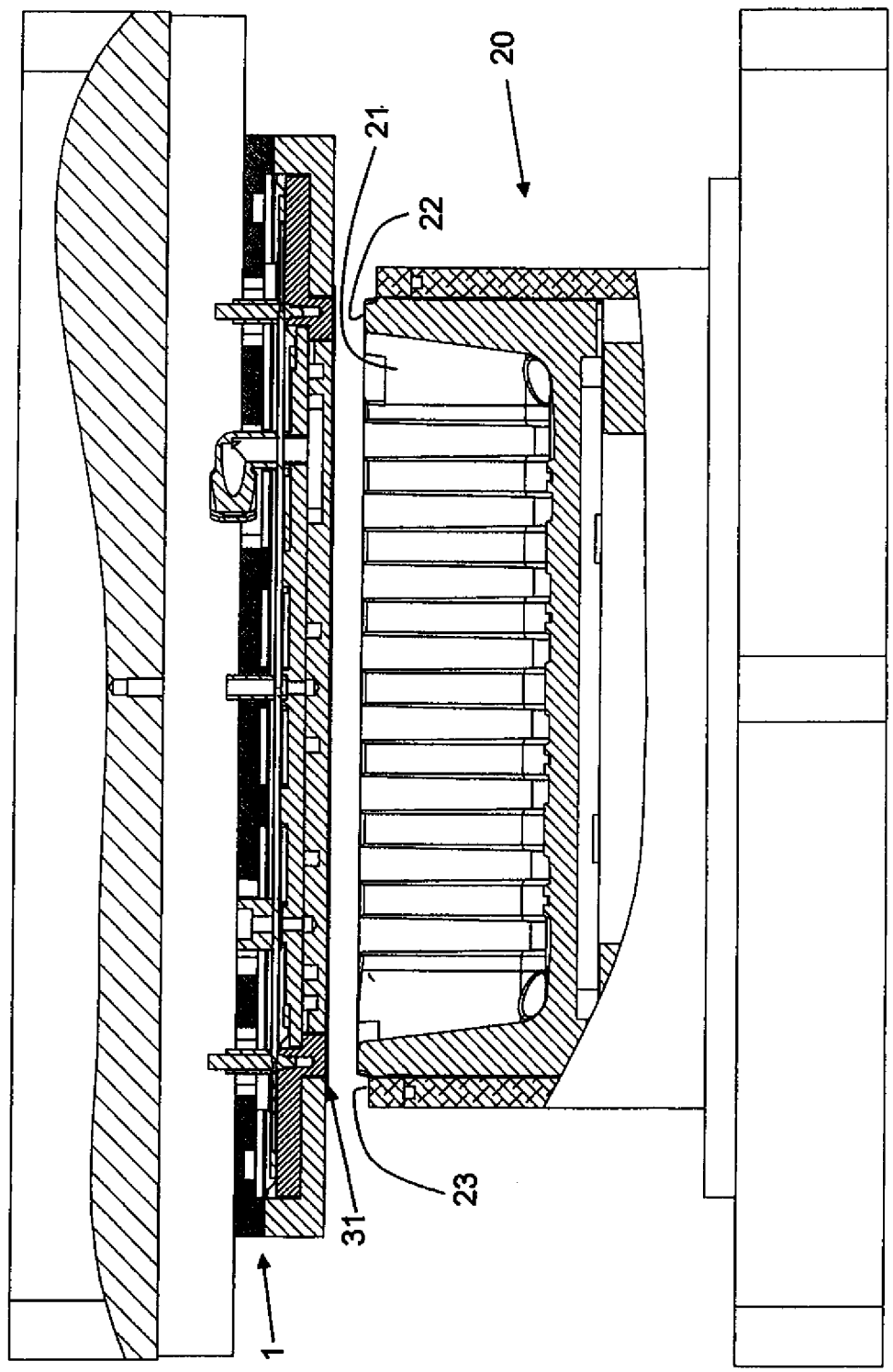
Fig. 2.1

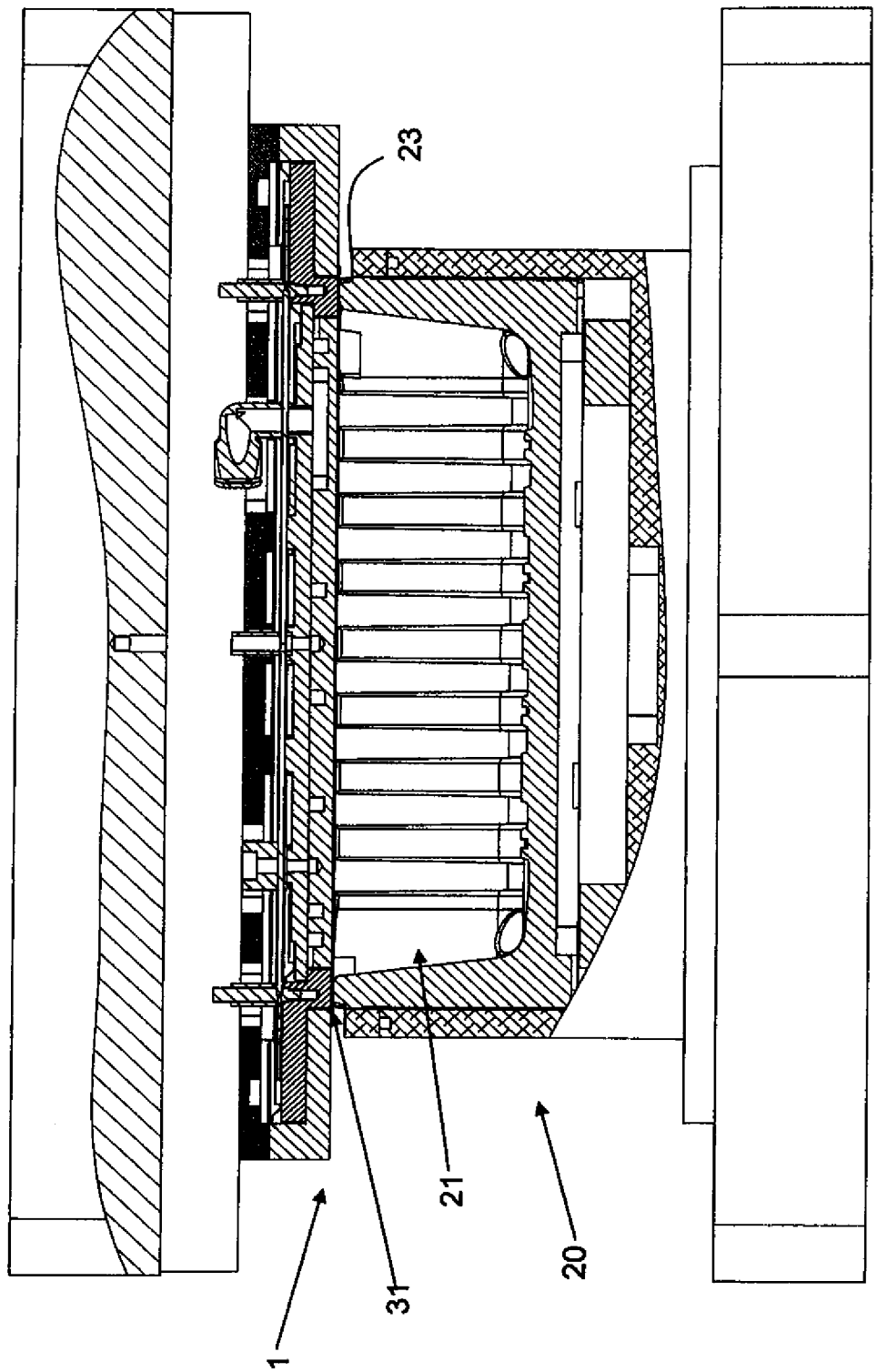
Fig. 2.2

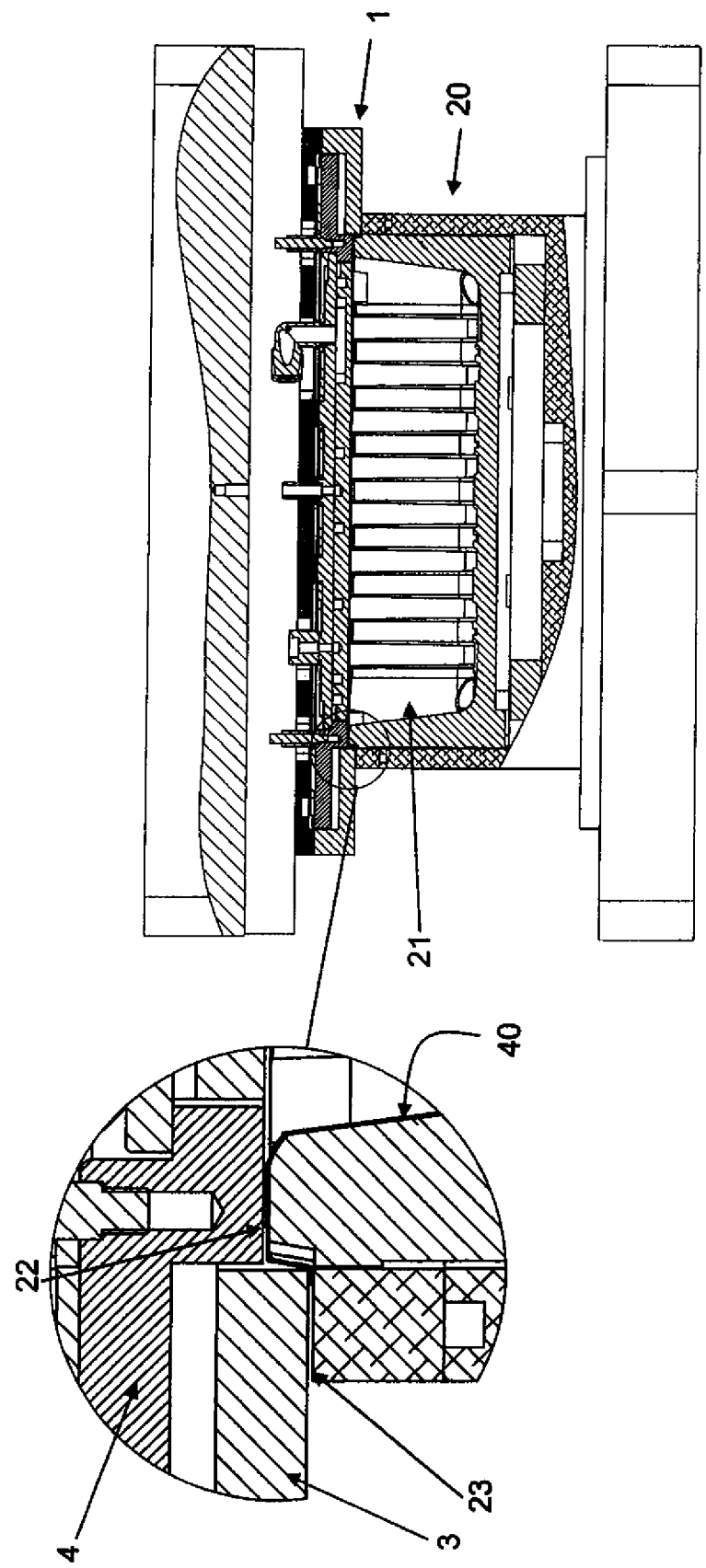
Fig. 2.3

PLATE AND APPARATUS FOR FORMING A PLASTIC MATERIAL FLANGED HOLLOW ARTICLE

TECHNICAL FIELD

The present invention concerns in general the forming by moulding of a hollow container provided with a perimeter flange, for example a tray. In particular it concerns a plate able to cooperate with a mould to form said container. The invention also concerns a forming machine comprising at least one of said plates. The container formed can be used to contain an article, for example a food product which may be fresh, frozen, cooked, dehydrated or in any form.

BACKGROUND ART

A wide variety of products, especially food products like meat, sausages, cheese and the like, are often offered in visually attractive packages made of two webs (namely, a lower web and an upper web) using a vacuum skin packaging process, a thermoforming process or other methods.

The lower web is typically used as a support for the product and may be flat or heated and thermoformed to the desired shape, thus forming a receptacle for the product to be packaged. The lower web typically comprises a rigid or semi-rigid substrate, such as for instance of a plastic or cardboard material, and a sealing layer. The upper web is typically a flexible and formable film with a sealing layer that, in the end package, faces the sealing layer of the lower web.

Various forming machines are known in the art.

U.S. Pat. No. 6,896,506 discloses a thermoforming machine including a loading station configured to load a thermoplastic billet onto a frame. The frame has an outer ring and a billet support blade defining a channel therebetween. The billet support blade engages the billet to maintain the billet on the frame during heating of the billet. A heating apparatus is configured to heat the billet and a forming station is configured to form the billet into a container. In one embodiment, a preheating station may be utilized to perform initial heating of the billets. Such initial heating may be desired when a coining press is utilized to create an initial structure on the billet, such as adding a rim around the peripheral edge of billet.

U.S. Pat. No. 4,836,764 discloses an apparatus for the thermal pressure forming of plastic blanks into containers which includes several elements. A heater brings the plastic blanks to a melt phase by heating them to a melting temperature sufficient to relieve internal stresses therein. A conveying arrangement takes the plastic blanks through the heater. Thereafter, a press forms the plastic blanks into retortable containers.

U.S. Pat. No. 4,563,325 discloses an apparatus and method for producing articles by stretch-forming or pressure-forming of thermoplastics in the solid crystalline phase which permits forming from a billet of given thickness articles of greater wall thickness than would be formed by stretch-forming or pressure-forming the clamped billets.

U.S. Pat. No. 3,947,204 discloses an apparatus for making thermoplastic containers. The apparatus takes a measured amount of thermoplastic material which is lubricated, heated and forged into a desired shape preform with a predetermined lip configuration. The center portion of each said preform is maintained at a forming temperature while the peripheral portion thereof is clamped and rapidly brought below the softening point of the plastic resin. Blanks are forged in a forging means having a cooled lip forming means.

U.S. Pat. No. 3,546,746 discloses an apparatus for forming flanged hollow articles of work-strengthenable plastic materials. The outer edge of a blank is gripped around its periphery against a transverse seat.

U.S. Pat. No. 3,502,310 discloses a hot plate billet heater and method of heating.

U.S. Pat. No. 7,481,640 discloses a scrapless thermoforming machine including a plurality of transport trays having frames configured to hold thermoplastic billets and billet clamps.

U.S. Pat. No. 5,035,600 discloses an apparatus for converting thermoplastic blanks into shaped articles having a wheel-shaped conveyor which carries an outwardly extending link for a coupling which can engage successive blanks of a series of blanks during advancement along a first portion of its endless path.

U.S. Pat. No. 4,352,766 discloses a scrap-free, substantially solid phase, relatively low temperature process for rapidly making plastic articles from resinous powders wherein the resultant articles can comprise various polymers NL 8501418 relates to a blow or vacuum moulding acrylic plastic roof dome.

SUMMARY OF THE INVENTION

The Applicant has noticed that the known machines and methods have some drawbacks and are not fully satisfactory. Accordingly, the Applicant has tackled the problem of providing an improved plate, machine and method for forming a flanged hollow article, such as for instance a plastic flanged tray or the like.

In particular the Applicant has tackled the problem of providing such a forming plate and machine operable at the site of the company loading the receptacle or container with food or other items, which is able to form a receptacle or container in a precise manner starting from a billet of plastic material.

In the present description and claims a billet is intended to be a blank of thermoformable plastic film cut in a proper size and shape for forming a flanged hollow article. A billet, once a receptacle or container is formed, should not be further cut or trimmed. One preferred material for the billet is PET. As an alternative, polylactic acid (PLA), polystyrene (PS), PA Nylon and Polymethyl methacrylate (PMMA) may be used.

According to a first aspect, the present invention provides a plate for a mould station to form a flanged hollow plastic container by shaping a flat billet, the plate comprising a base, a frame, an outer core to form a container of a first size and an inner core to form a container of a second size, smaller than the first size, wherein the frame is integral with the base and wherein the frame defines a frame upper surface; wherein the outer core, in a first configuration, is held elastically with its upper surface flush with the frame upper surface and, in a second moulding configuration, is held with its upper surface recessed with respect to the frame upper surface; wherein the inner core, in a first configuration, is held elastically with its upper surface flush with the frame upper surface and, in a second moulding configuration, is held with its upper surface recessed with respect to the frame upper surface; and wherein a retention system is provided to retain said billet substantially adhering to at least the upper surface of the inner core.

Profitably, the plate can be heated by means of a heating device.

Preferably, the heating device comprises electric resistors applied to said outer core and electric resistors applied to said inner core.

Preferably, the retention system comprises a system of retention by means of a vacuum.

The plate preferably also comprises a pressurised air supply system to shape the flat billet so that it conforms to a mould cavity.

The supply system may also comprise a slot between said frame and said outer core to form the flange of said flanged container.

The supply system may also comprise a slot between said frame and said outer core to form the flange of said flanged container.

In one preferred embodiment, the plate also comprises a counter-plate or cover to retain in a sandwich arrangement a billet between said plate and said counter-plate.

Profitably, the counter-plate may be hinged to said plate so that it can be opened before the moulding phases.

In one preferred embodiment, the counter-plate is heated.

The plate may be formed of aluminium or aluminium alloy.

According to a further aspect, the present invention provides a forming machine to form flanged hollow plastic containers, said forming machine comprising a storage reservoir for the billets, a device for taking and feeding the billets, an arrangement of plates and a moulding station, wherein said arrangement of plates comprises at least two plates as set forth above.

The arrangement of plates may comprise plates arranged horizontally and which can revolve about a vertical axis.

AS an alternative, the arrangement of plates may comprise plates which can revolve about a horizontal axis.

The billet taking and feeding device may comprise two platens fixed revolving about a slanting axis and rotating alternately by approximately 180°.

BRIEF DESCRIPTION OF THE DRAWINGS

The present invention will become clearer by reading the following detailed description, given by way of example and not of limitation, to be read with reference to the accompanying drawings, wherein:

FIG. 1.1 is a plan view from below of a flat plate according to an embodiment of the invention;

FIG. 1.2 is a section view along the line E-E of FIG. 1.1;

FIG. 1.3 is a section view along the line H-H of FIG. 1.1;

FIG. 1.4 is a section view along the line K-K of FIG. 1.1;

FIG. 1.5*a* is a plan view from above of the plate of FIG. 1.1;

FIG. 1.5*b* is a plan view similar to FIG. 1.5*a* but with the inner core shown transparently;

FIGS. 1.6.1, 1.6.2 and 1.6.3 are section views along the line C-C of FIG. 1.1;

FIG. 1.7 is a section view along the line J-J of FIG. 1.5*b*;

FIGS. 2.1, 2.2 and 2.3 show three phases of moulding of a large container;

DETAILED DESCRIPTION

Figure 3:
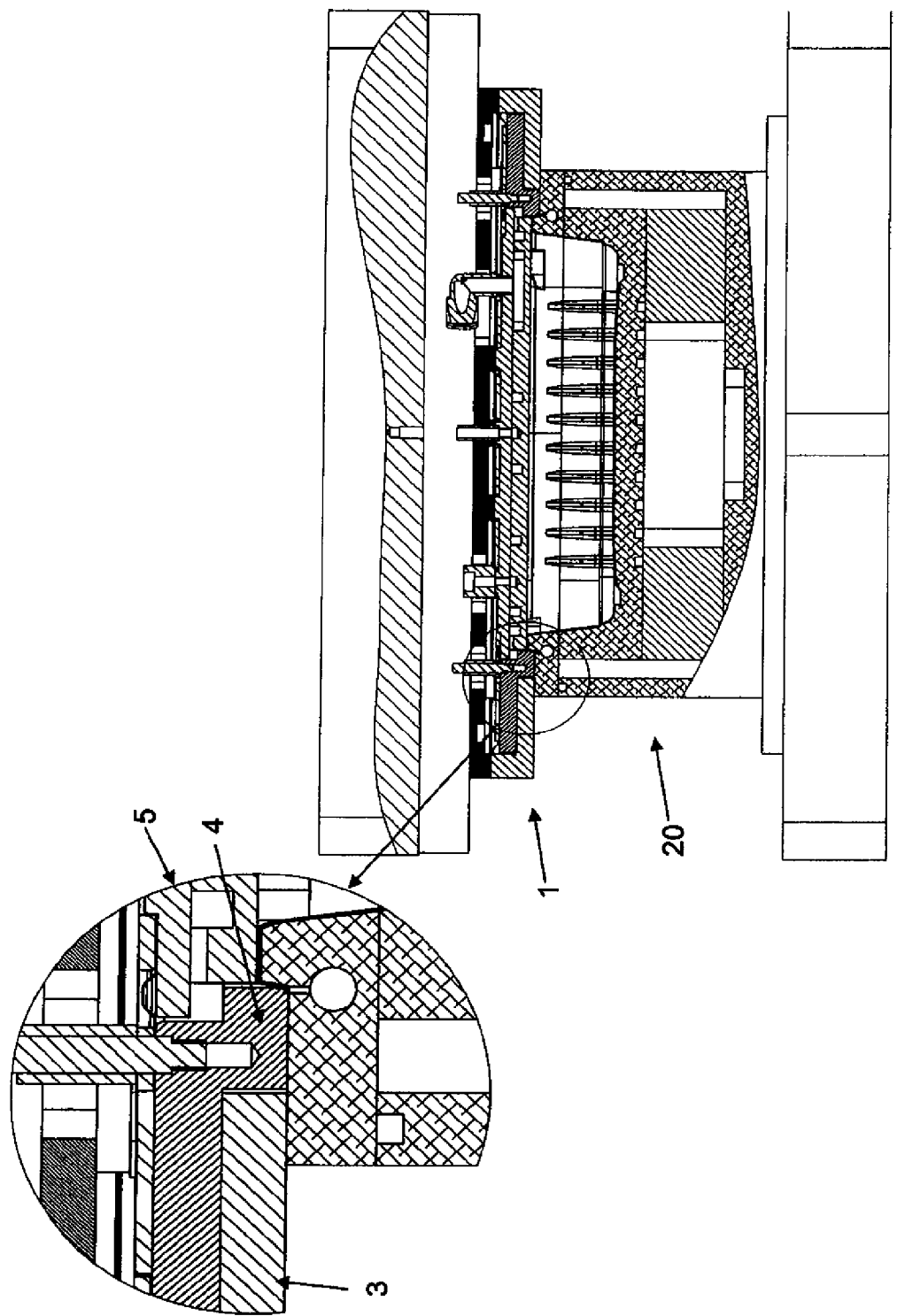
FIG. 3 shows the last moulding phase of a small container.

FIG. 1 show an embodiment of a flat plate according to the present invention. The plate is adapted to cooperate with a mould to form a container. The container formed can be a tray to contain and support food products or articles of various types. For the sake of convenience, the present description will refer mainly to trays but this does not constitute a limitation since the present invention is not limited to any specific type of container.

The plate 1 can have a substantially rectangular form and comprises a base 2, a frame 3, an outer core 4 for large trays and an inner core 5 for small trays.

The frame 3 is fixed integral with the upper face of the base 2 along at least part of a lower perimeter area thereof. In one embodiment (not shown), the base and the frame are in one single piece. The frame 3 forms a perimeter cavity to retain the outer core 4. The cavity can be seen, for example, in FIG. 1.2 and is defined by the substantially L-shaped section of the frame. The outer core 4 is shaped so as to be partially inserted in the cavity defined by the frame 3.

The outer core 4 is held elastically with its upper surface flush with the upper surface of the frame 3 (FIG. 1.6.1). As shown in FIGS. 1.6.2 and 1.6.3, the outer core 4 has a thickness T3 inferior to the thickness T4 of the frame 3. Therefore, between the lower face of the outer core 4 and the upper face of the base 2 there is an empty space (height T4-T3). As will be described below, during the moulding phase, the outer core 4 can be pushed towards the base 2 (FIG. 1.6.3) so that its upper surface is recessed with respect to the surface of the frame 3. When the outer core 4 is pushed towards the base 2, it also drags the inner core 5 towards the base 2 (FIG. 1.6.3).

The outer core 4, analogously to the frame 3, forms a cavity to retain the inner core 5. The inner core 5 fits partially into the cavity defined by the outer core 4. The inner core 5 is held elastically with its upper surface flush with the upper surface of the outer core 4 (FIG. 1.6.1). The inner core 5 (where it fits into the cavity of the inner core) has a thickness T1 inferior to that of the outer core 4. Therefore, between the lower face of the inner core 5 and the upper face of the base 2 there is an empty space. As will be described below, the inner core 5 can be pushed towards the base 2, countering the elastic force which maintains the upper surface of the inner core flush with the upper surface of the outer core and the frame. Pushing the inner core towards the base, the upper surface of the inner core 5 is recessed with respect to the upper surface of the outer core 4. This configuration is shown in FIG. 1.6.2.

The elastic retention of the outer core 4 and the inner core 5 with respect to the base 2 is obtained by means of springs (as in the embodiment shown) or could be obtained by means of pneumatic or hydraulic cylinders.

Preferably, the plate 1 also comprises an air supply circuit to supply compressed air during the moulding phases. The same circuit permits the creation of a vacuum to retain a billet substantially adhering to the outer surface 11 of the plate 1.

The circuit comprises at least one connection 8 to connect the circuit to a compressed air supply or, alternatively, to a vacuum pump (not shown). Preferably, at least one primary connection 8*a* and at least one secondary connection 8*b* are provided.

The at least one primary connection 8*a* is conveniently connected to an inner chamber 10 of the inner core 5. The inner chamber 10 communicates with the outside via small holes 13. Preferably the holes 13 are in an orderly symmetrical configuration (FIG. 1.5*a*). Via the holes 13, air of the circuit can flow out or a vacuum can be created to retain a billet substantially in contact with the outer surface 11 of the plate 1.

The at least one primary connection 8*b* is conveniently connected to an outer chamber 9. According to the position of the outer core with respect to the base, the outer chamber 9 is defined between the base and the lower surface of the outer core (FIG. 1.6.1) or between the frame and the outer core (FIG. 1.6.3).

Furthermore, between the frame 3 and the outer core 4 there is a slot 14 which, as will become clear below, permits the formation of a flange during formation of the tray. Analogously, also between the outer core and the inner core there is a slot 15 with analogous function.

FIG. 1.5b shows the ducts that convey air to the slots 14 and 15.

The plate 1 is conveniently made of metal, for example aluminium, aluminium alloy or steel. It can be heated by heating elements, for example flat heating elements 19 glued to the lower face of the inner core and the outer core. In FIG. 1.6 the flat heating elements are shown thicker in order to facilitate identification.

FIGS. 2.1, 2.2 and 2.3 show three moulding phases of a large tray, i.e. moulded with the outer core 4 of the heated plate 1.

The mould 20 comprises a mould cavity 21 with a flat upper edge 22 and a flange-forming surface 23 which develops externally to the mould cavity around the flat upper edge 22. It should be noted that the form of the mould cavity is not relevant for the present invention and will therefore not be described in detail. Also the form of the flange-forming surface 23 can be different from that illustrated in the various figures and in particular in the enlargement of FIG. 2.3. Typically, the flange-forming surface 23 comprises, starting from the edge 22, an inclined (or vertical) surface and a substantially horizontal surface.

In FIG. 2.1 the mould 20 is shown open, i.e. separate from the relative plate 1. Both the mould 20 and the plate 1 are shown partially in section. In the same figure, the plate 1 is shown with a thin billet 31 fixed to it. The billet 31 is held adhering to the face 11 of the plate 1 by means of an air suction (vacuum) system. Since the plate 1 is heated, the billet 31, which is made of a thermoformable plastic material, softens due to the contact with the plate. A suitable material is polyethylene terephthalate (PET) or similar. As an alternative, polylactic acid (PLA), polystyrene (PS), PA Nylon and Polymethyl methacrylate (PMMA) may be used.

As will be specified also below, to further improve heating of the billet 31, it can be closed in a sandwich arrangement between the plate 1 and a counter-plate, also heated. Obviously, the counter-plate must be removed before the plate 1 (with the billet attached to it) is rested on the mould 20.

When the plate 1 is rested on the mould 20, the billet 31 is brought into contact with the edge 22 of the mould and is retained in position (FIG. 2.2). Obviously, the contact with the mould occurs only at the edge 22 and the billet 31 is "pinched" between plate 1 and edge 22. In other words, the billet 31 protrudes from the edge 22 of the mould. The protruding part of the billet is not supported by the edge 22 of the mould. Analogously, the billet 31 is not mechanically supported in the zone inside the edge 22 of the mould, i.e. in the mould cavity 21.

A further movement of the plate 1 and the mould 20 nearer to each other causes crushing (i.e. recessing) of the outer core 4 with respect to the outer surface of the frame 3. In this way the area along the outer perimeter of the billet 31 forms a perimeter flange 42 visible also in the moulded tray 40. Conveniently, formation of the perimeter flange 42 can be aided by a jet of air emitted from the slot 14 between the outer core 4 and the frame 3. Said jet of air promotes adhesion of the area along the outer perimeter of the billet to the above-mentioned flange-forming surface 23.

Preferably, after formation of the flange, the cavity 41 of the container 40 is formed. The cavity can also be formed before forming the flange or during formation of the flange. To form the flange, the vacuum that retained the billet 31 on the heated plate is released. Via jets of pressurised air, emitted via the same holes 13 through which the plate was retained by the vacuum, the billet 31 is pushed to adhere to the mould cavity 63 (FIG. 2.3).

Subsequently, the plate 1 is moved away from the mould 20 and the tray formed 40 is removed from the mould 20.

FIG. 3 is analogous to FIG. 2.3 but shows the final phase of moulding of a small tray, i.e. moulded with the inner core 5 of the plate 1.

The moulding process is analogous to the one described in detail for the large tray and will not be described again. The difference lies in the fact that when the plate 1 is pressed towards the mould 20, the inner core 5 is crushed (i.e. recessed) with respect to the outer surface of the outer core 4. In this way the area along the outer perimeter of the billet 31 forms a perimeter flange 42 visible also in the moulded tray 40. Conveniently, formation of the perimeter flange 42 can be aided by a jet of air emitted from the slot 15 between the outer core 4 and the inner core 5. Said jet of air promotes adhesion of the area along the outer perimeter of the billet to the above-mentioned flange-forming surface 23.

Subsequently, the plate 1 is moved away from the mould 20 and the tray formed is removed from the mould.

As mentioned above, a billet positioned on a plate 1 according to the invention can be retained adhering to the flat outer surface 11 of the plate by means of a suction system. The plate 1, if necessary with the billet adhering to its flat surface 11, can be translated, rotated or roto-translated. In other words, the billet remains adhering and "secured" to the plate even when the plate moves (or tilts). Therefore, a billet can be loaded on a plate and the plate with the billet loaded can then be moved towards the mould.

In any case, to guarantee that the billet does not substantially move with respect to the plate, a counter-plate may be provided to close in a sandwich arrangement a billet between the plate 1 and the corresponding flat counter-plate. Conveniently, also the counter-plate could be heated so as to heat the billet on both its two faces. This allows better, more uniform and more reliable softening of the billet.

In an advantageous embodiment, the counter-plate can be hinged along one side of the plate 1.

The plate and mould system as described above forms a mould station which can be incorporated in a forming machine for flanged trays (or, more generally, containers). Two possible embodiments of a forming machine are described below.

Figure 4:
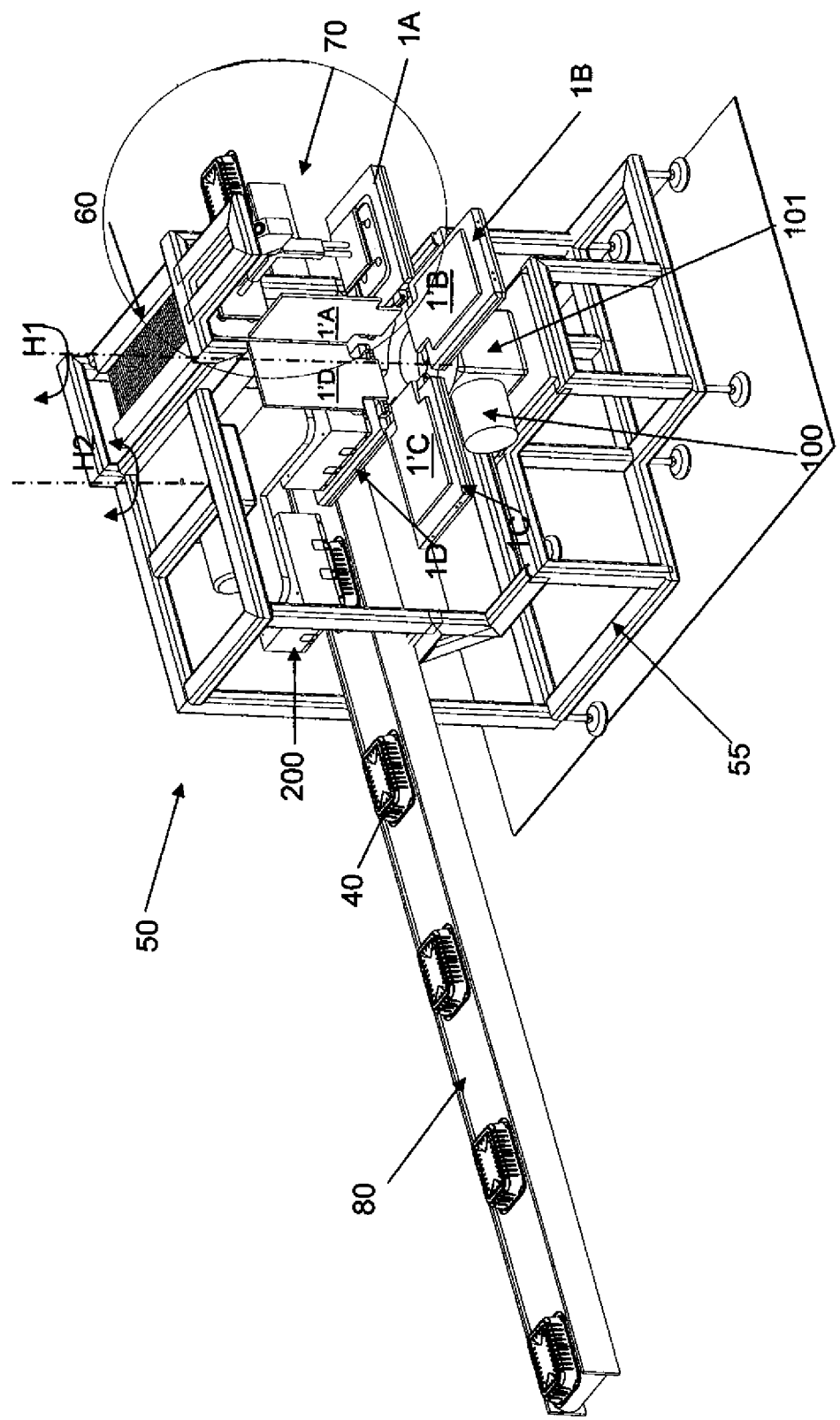
FIG. 4 is an axonometric view of a first embodiment of a machine according to the present invention.

FIG. 4 is an axonometric view of a first embodiment of the machine 50 according to the present invention. In particular the machine 50 is in one configuration of its work cycle.

The machine 50 according to the first embodiment preferably comprises a frame 55, a storage reservoir 60 for the billets 31, a device 70 for taking and feeding the billets 31, an arrangement 100 of heated plates 1 and a mould station 200. Preferably, a conveyor belt 80 is also provided for conveying the formed trays 40 towards a packaging area or a storage zone of the trays 40. The storage or packaging area is not shown in the drawings as it is not relevant for the purposes of the invention.

The frame 55 is illustrated schematically but it is clear that it can take any form, also different from the one illustrated.

The billet storage reservoir 60 is configured so as to keep a certain number of billets 31 in an orderly manner so that they can be easily withdrawn by the billet taking and feeding device 70. The billets 31 can be stacked to form a substantially vertical pile but they are preferably stacked to form a substantially horizontal pile. This makes the machine more compact.

Preferably, the billet taking and feeding device 70 comprises a first taking platen 71 and a second taking platen 72 mounted so that they can rotate about a slanting pin with angle of 45°. Each platen has an upper face 71A, 72A and a lower face. The lower face is provided with means 73 suitable for retaining a billet 31 taken from the billet storage reservoir 60 and releasing it on one of the plates 1 of the arrangement of heated plates 100. By way of example, the means 73 suitable for retaining the billet 31 and releasing it can comprise a suction cup 73 with suction system. Preferably a plurality of suction cups is provided in a symmetrical configuration. The upper face 71A and 72A of the platens is preferably connected to pneumatic cylinders 74 with dual stem so that the suction cup can be moved close to (or away from) the plate 1 on which a billet will be loaded. The pneumatic cylinders 74 also allow the platen to be moved close to a billet of the storage reservoir or move it away after the billet has been taken. Preferably, the structure on which the platens are fixed rotates approximately 180° with an alternating movement.

In the first embodiment the arrangement 100 of heated plates comprises four plates 1 arranged horizontally in the shape of a star or cross, i.e. at 90° with respect to one another. The plates 1 are substantially identical to one another and will be generically marked by the reference number 1 already used above in this description. The letter (A, B, C and D) after the number 1 is added for convenience of description of operation of the machine 50.

Preferably each plate 1A-1D also comprises a counterplate (possibly heated) 1'A, 1'B, 1'C and 1'D hinged at one of its sides in the manner of a cover, typically the inner short side. Thanks to the cover, a billet 31 can be positioned on the heated flat plate 1 and closed in a sandwich arrangement between the cover 76 and the upper face of the plate.

Figure 5:
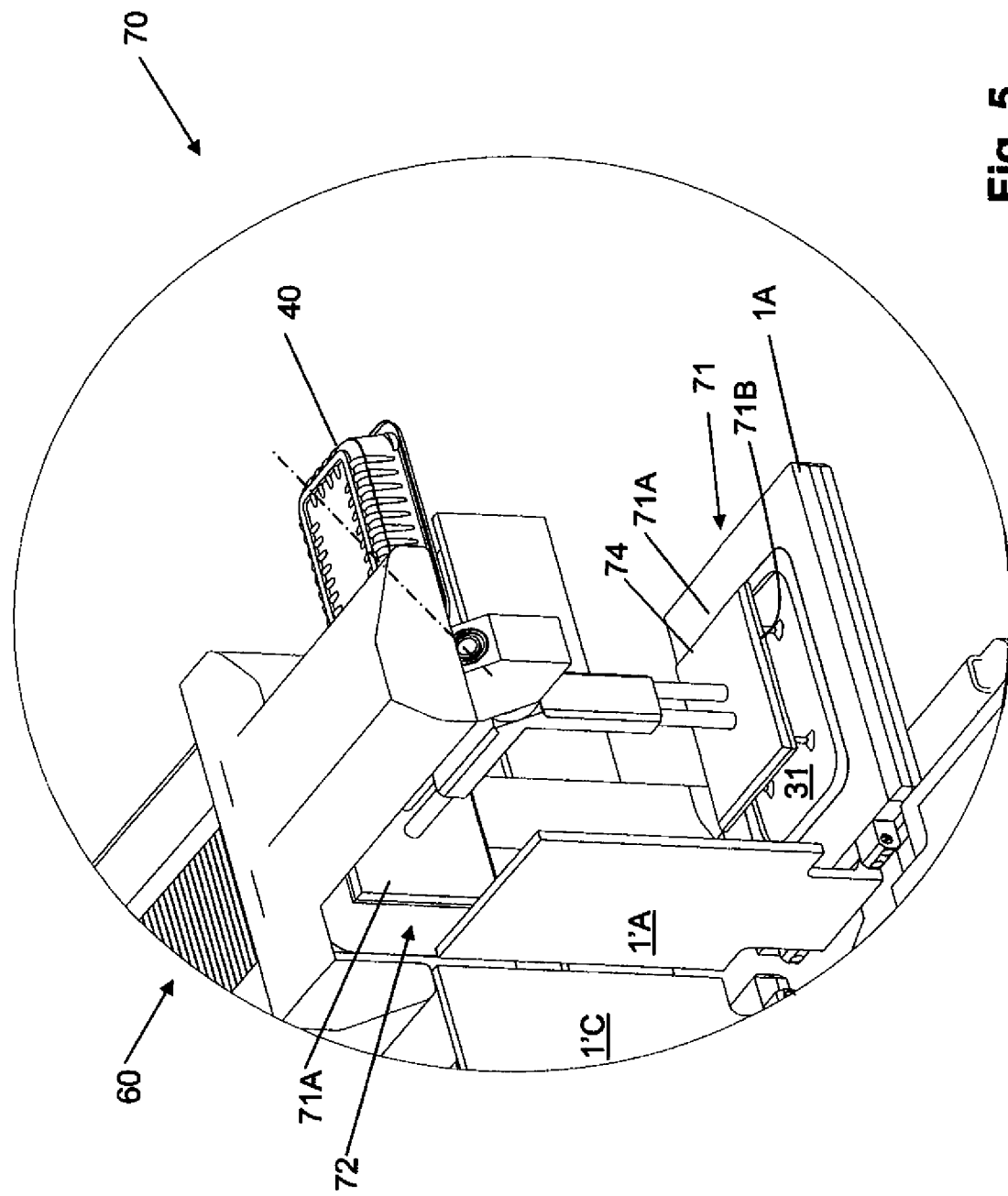
FIG. 5 shows the billet taking and feeding device in the configuration of FIG. 4.
Figure 6:
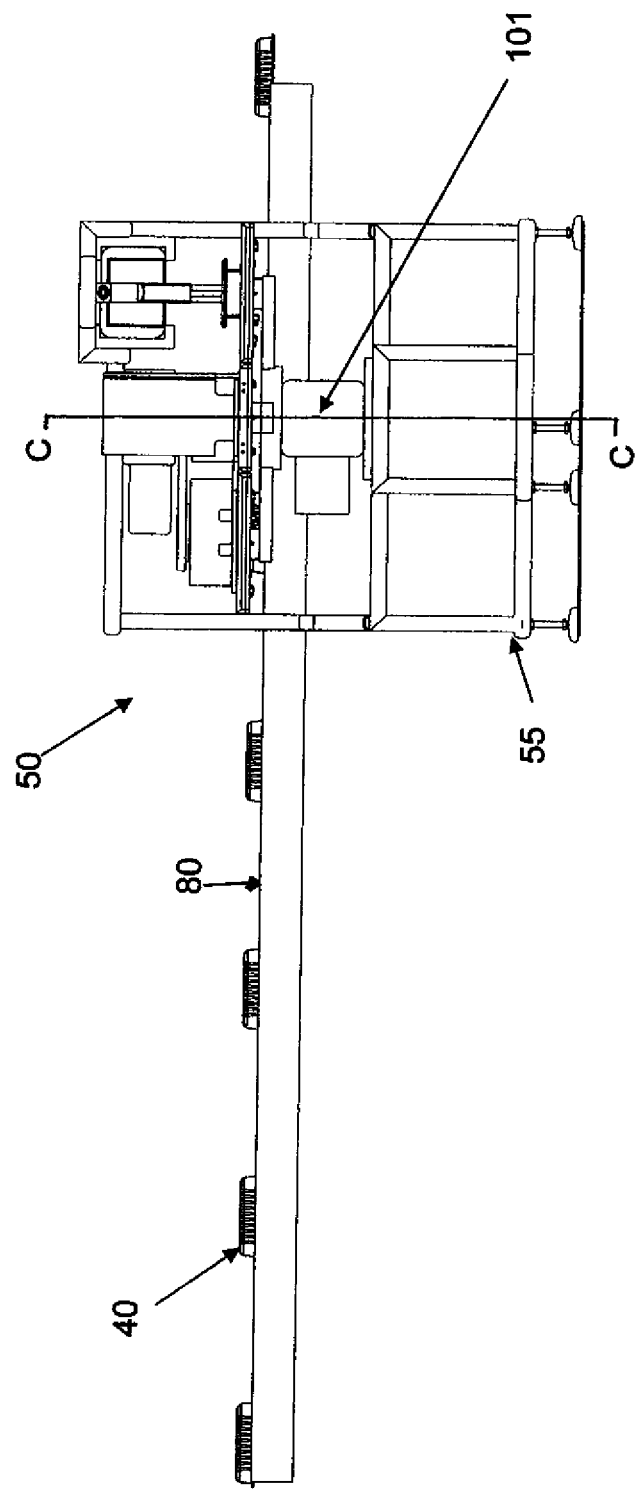
FIGS. 6 and 7 are a front view and a side view respectively of the machine of FIG. 4.
Figure 7:
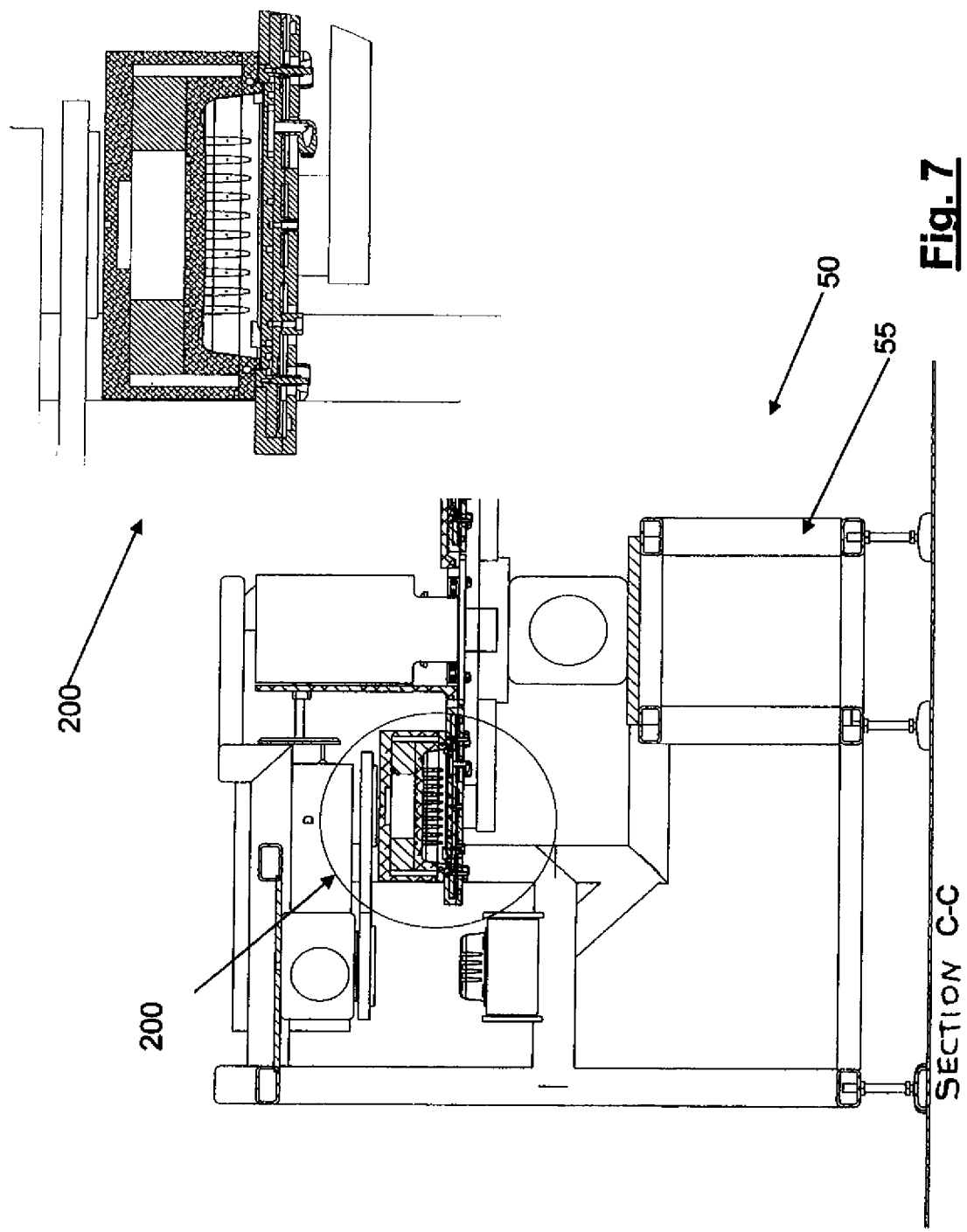

FIG. 4 shows the four heated plates 1A, 1B, 1C and 1D. The heated plate 1A is being loaded with a billet and therefore has its cover 1'A open (FIG. 5). The heated plate 1B is heating a billet (loaded in the previous cycle) which is closed in a sandwich arrangement between the plate and the cover 1'B. The heated plate 1C is heating a billet (loaded two cycles previously) closed in a sandwich arrangement between the plate and the cover 1'C. The heated plate 1D, on the other hand, is cooperating with one of the two moulds 20A, 20B of the mould station 200 to form a tray 40. Obviously, the cover 1'D is open, i.e. raised.

The arrangement of heated plates can be rotated about a vertical axis V1 by means of a motor 101. The rotation can be clockwise or anti-clockwise. In the embodiment of FIG. 4 the rotation is clockwise (as indicated by the arrow around the axis V1). At each cycle, each heated plate 1 is rotated 90° so that it sets to the same position after four cycles. Each heated plate 1 remains at a standstill in position for a preset time in order to permit the moulding of a tray 40 and, simultaneously, loading of a billet 31 on the adjacent heated plate in the direction of rotation.

The mould station 200 comprises a mould 20 configured to cooperate with a plate 1 to form a tray 40 from a billet 31 positioned on the plate 1. Preferably the mould station 200 comprises a first and a second mould 20A, 20B fixed to an L-shaped arm 24 with their cavity 21 facing downwards. The L-shaped arm 24 can rotate alternately around a vertical axis V2 between a first position and a second position. In the first position, the first mould 20A is releasing a formed tray (for example onto a conveyor belt, downstream of the mould station as in FIG. 4) and the second mould 20B is forming a new tray 40. In the second position, the operations of the two moulds 20A and 20B are inverted and the second mould 20B is releasing a formed tray onto the conveyor belt upstream of the mould station.

Therefore, preferably, downstream of the mould station a conveyor belt 80 is provided on which the formed trays 40 are placed.

Four phases of the machine will now be described (from the machine start-up phase) according to the first embodiment and the phase in which the machine is in a steady state.

Phase 1 (Initial)
First platen 71 takes a billet;
Second platen 72 releases a billet onto first plate 1A;
First plate 1A is loaded with a billet from second platen 72, cover 1'A open;
Second plate 1B not loaded with billet, cover 1'B closed;
Third plate 1C not loaded with billet, cover 1'C closed;
Fourth plate 1D not loaded with billet is in the mould station, cover 1'D open.

Phase 2
First platen 71 releases a billet onto the plate 1D;
Second platen 72 takes a billet;
First plate 1A loaded with a billet, cover 1'A closed;
Second plate 1B not loaded with billet, cover 1'B closed;
Third plate 1C not loaded with billet is in mould station, cover 1'C open;
Fourth plate 1D is loaded with billet from platen 71, cover 1'D open.

Phase 3
First platen 71 takes a billet;
Second platen 72 releases a billet on the plate 1C;
First plate 1A loaded with a billet, cover 1'A closed;
Second plate 1B not loaded with billet is in the mould station, cover 1'B open;
Third plate 1C is loaded with billet from platen 72, cover 1'C open;
Fourth plate 1D loaded with billet, cover 1'D closed.

Phase 4
First platen 71 releases a billet on the plate 1B;
Second platen 72 takes a billet;
First plate 1A loaded with a billet is in the mould station, cover 1'A open; a tray 40 is formed;
Second plate 1B is loaded with billet from platen 71, cover 1'B open;
Third plate 1C loaded with billet, cover 1'C closed;
Fourth plate 1D loaded with billet, cover 1'D closed.

Phase 5 (Steady State)
Second platen 72 releases a billet on plate 1A;
First platen 71 takes a billet;
First plate 1A is loaded with a billet from platen 72, cover 1'A open;
Second plate 1B loaded with billet, cover 1'B closed;
Third plate 1C loaded with billet, cover 1'C closed;
Fourth plate 1D loaded with billet is in the mould station, cover 1'D open; a tray 40 is formed;
Tray 40 formed in the previous phase deposited on conveyor belt 80.

Therefore when the machine 1 is in a steady state, at each cycle a tray 8 is formed and placed on the conveyor belt.

Figure 8:
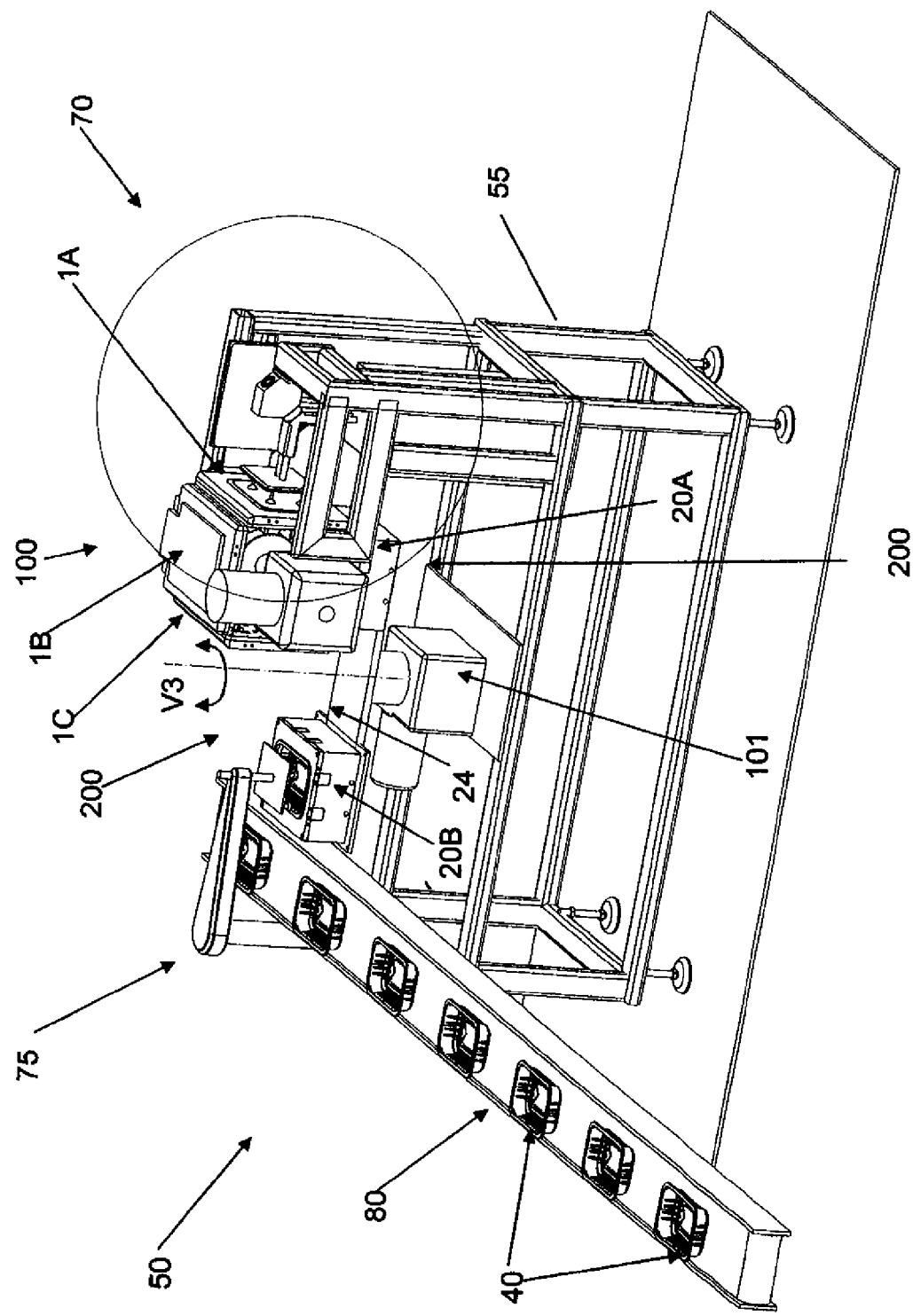
FIG. 8 is an axonometric view of a second embodiment of a machine according to the present invention.
Figure 9:
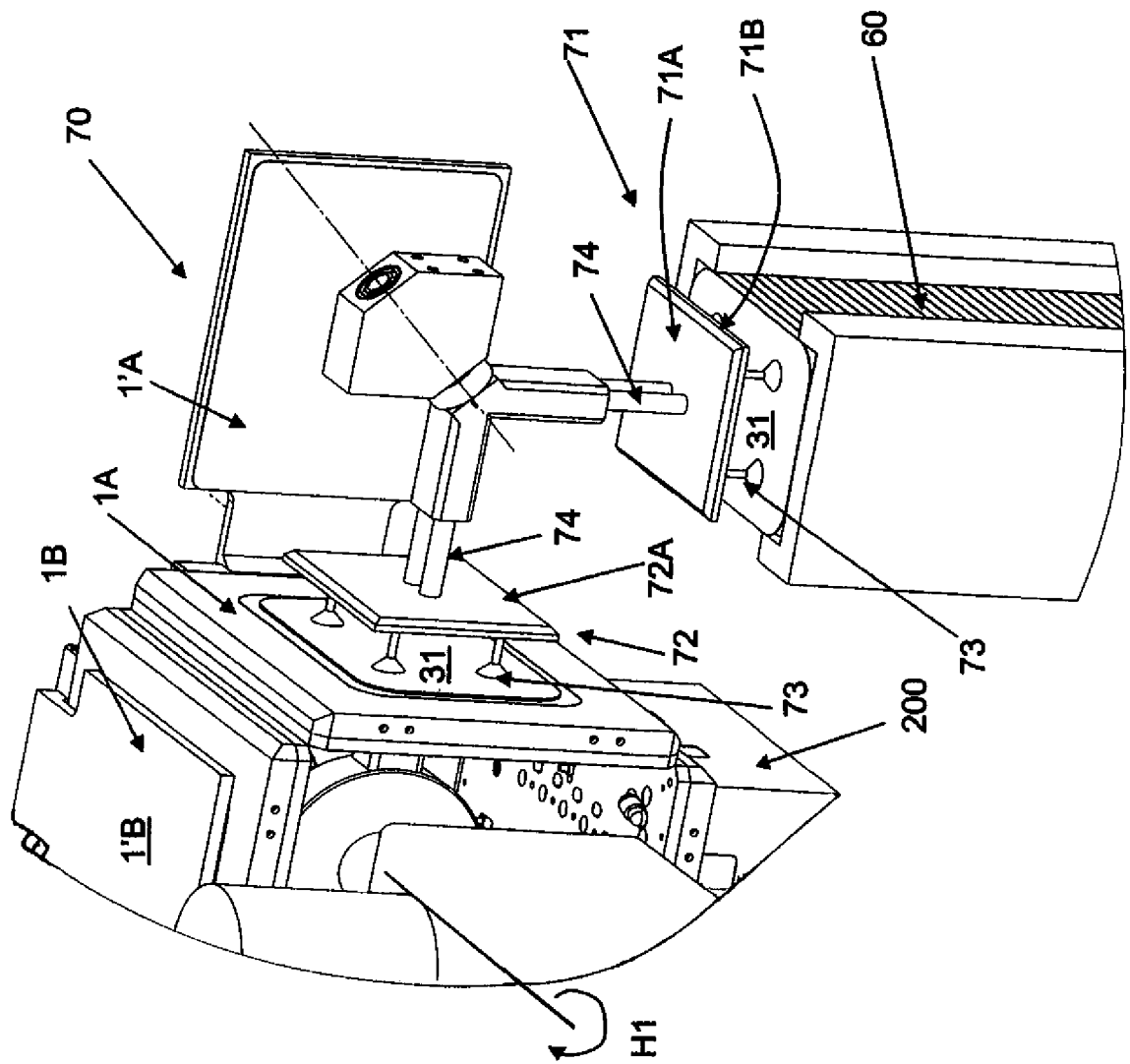
FIG. 9 shows the billet taking and feeding device in the configuration of FIG. 8.

Starting from the axonometric drawing of FIG. 8, a second embodiment of the machine 50 according to the present invention is now briefly described. The machine 50 according to the second embodiment has several analogies with the machine according to the first embodiment. The same reference numbers will be used to indicate the same parts or functionally equivalent parts. The main difference with respect to the machine 50 of the first embodiment is that the heated plates 1 rotate about a horizontal axis H1 instead of a vertical axis V1.

Preferably, the billet take and feed device 70 comprises a first taking platen 71 and a second taking platen 72 mounted in order that they can rotate about a slanting pin with angle of 45° so that, at each cycle, one is arranged substantially horizontally and the other substantially vertically. Rotation of the plates, fixed to a supporting structure, is preferably obtained by means of an electric, pneumatic or hydraulic motor.

In the second embodiment the arrangement 100 of plates 1 comprises four flat plates 1A, 1B, 1C and 1D arranged to form the lateral surfaces of a parallelepiped with square section. Preferably each plate 1 also comprises a cover 1'A, 1'B, 1'C and 1'D hinged at one of its short sides. A billet 31 can be arranged on the flat plate 1 and closed in a sandwich arrangement between the cover 1' and the upper face of the plate.

The arrangement 100 of plates 1 can be rotated about the horizontal axis H1 by means of a motor. The rotation can be clockwise or anti-clockwise. Each heated plate 1 is rotated 90° so that it sets to the same position after four cycles. Each plate 1 remains at a standstill in position for a preset time to permit the moulding of a tray 40 and, simultaneously, loading of a billet on the adjacent plate.

The mould station 200 comprises a first mould 21A and a second mould 21B fixed aligned with a bracket 24 and with their concavity facing upwards. The bracket 24 can rotate about a vertical axis V3 between a first position and a second position. In the first position, the first mould does not cooperate with a plate 1 and the tray formed, still housed in the mould, is taken by a revolving tray taking device and placed on a conveyor belt 80. In the first position the second mould 21B is forming a new tray. In the second position the operations of the two moulds 21A and 21B are inverted. The bracket 24 rotates preferably in an alternating manner by approximately 180°.

The above description of the four phases of the machine according to the first embodiment and of the phase in which the machine is in a steady state is the same also for the second embodiment and will not be repeated.

Figure 10:
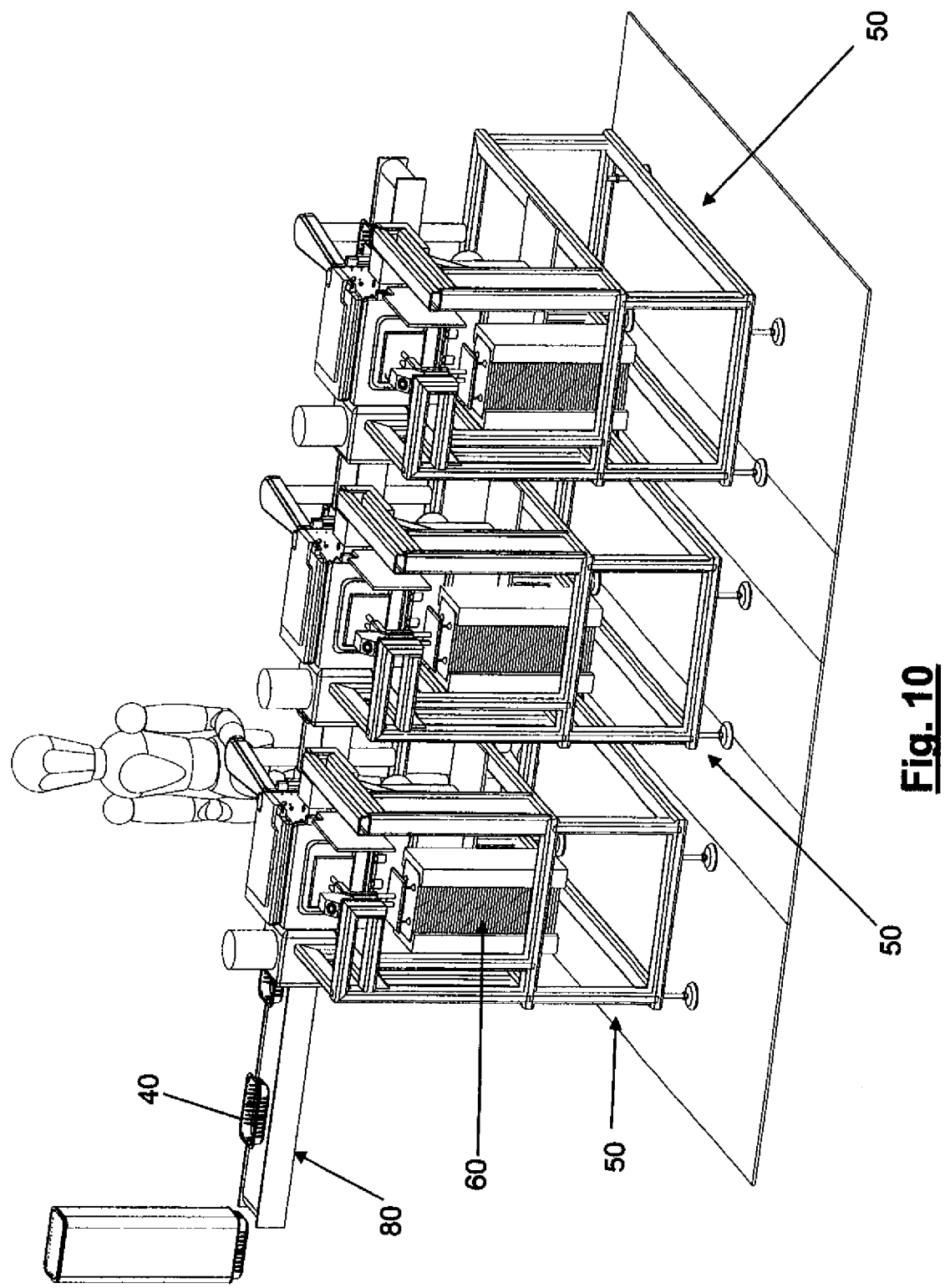
FIG. 10 is an axonometric view of three machines according to the second embodiment in a side-by-side configuration and supervised by one single operator.

The machine according to the second embodiment is more compact than the machine according to the first embodiment. Conveniently, therefore, two or more machines can be positioned side by side supervised by one single operator and with only one conveyor belt (FIG. 10).

According to the present invention, and contrary to the known solutions, a billet suitable for forming a tray is supported on a plate 1 having a substantially flat surface 11. The plate according to the invention holds the billet still by means of a suction system. The billet 31 is therefore retained and kept flat substantially throughout its surface and not only along one of its edges. The plate according to the invention comprises a heating system so that, while the billet is retained, it is also heated in a uniform manner and softened. This facilitates the forming process, making it more accurate and predictable, with the result that accurately shaped trays are obtained.

The plate, with the billet retained on its surface, can be moved by a translatory or rotatory movement (or a combination thereof) to reach a mould station and to cooperate with a mould.

Advantageously, a billet can be closed in a sandwich arrangement between a plate and a counter-plate (preferably also heated).

A further advantageous characteristic of the plate according to the present invention is that it can be set up to form containers of two or more different dimensions.

Thanks to the moulding system and the machines according to the present invention, it is possible to form the trays directly in the place where they are filled. Therefore, flat billets are transported and not bulky trays already formed. Transport and storage costs are drastically reduced. Furthermore, in the place where the trays are formed, there is no waste since billets are formed already in the correct size and shape. The waste deriving from cutting of the billets remains in the place where the billets are obtained starting from a roll of plastic film, therefore this waste does not have to be transported but can be recycled forming further plastic film which in turn is cut into billets.

Thanks to the heated plate in two dimensions, the same machine can be used to mould trays of a first size and trays of a second larger size. The only modification consists in replacement of the mould cavity each time.

The invention claimed is:

1. A plate useful for a mould station to form a flanged hollow plastic container by shaping a flat billet in a mould cavity, the plate comprising:
   a frame;
   an outer core to form a container of a first size; and
   an inner core to form a container of a second size smaller than the first size, wherein:
   the frame defines a frame upper surface;
   the outer core, in a first configuration, is held elastically with an outer core upper surface flush with the frame upper surface and, in a second moulding configuration, is held with the outer core upper surface recessed with respect to the frame upper surface;
   the inner core, in a first configuration, is held elastically with an inner core upper surface flush with the frame upper surface and, in a second moulding configuration, is held with the inner core upper surface recessed with respect to the frame upper surface; and
   a retention system is provided to retain the billet substantially adhering to at least the inner core upper surface.

2. The plate as claimed in claim 1 further comprising a heating device.

3. The plate as claimed in claim 2, wherein the heating device comprises electric resistors applied to the outer core and electric resistors applied to the inner core.

4. The plate as claimed in claim 1 wherein the retention system utilizes a vacuum.

5. The plate as claimed in claim 1 further comprising a pressurized air supply system to shape the flat billet to conform to the mould cavity.

6. The plate as claimed in claim 5 further comprising a slot between the frame and the outer core for the passage of air to assist the formation of the flange of the flanged container.

7. The plate as claimed in claim 5 further comprising a slot between the outer core and the inner core for the passage of air to assist the formation of the flange of the flanged container.

8. A plate assembly for a mould station to form a flanged hollow plastic container by shaping a flat billet in a mould cavity, the plate assembly comprising:
   the plate of claim 1; and
   a counter-plate to retain in a sandwich arrangement the billet between the plate and the counter-plate.

9. The plate assembly as claimed in claim 8, wherein the counter-plate is hinged to the plate, whereby the plate assembly can be opened.

10. The plate assembly as claimed in claim 8, wherein the counter-plate is heated.

11. The plate assembly as claimed in claim 8, wherein the plate assembly comprises aluminum or aluminum alloy.

12. A forming machine to form flanged hollow plastic containers by shaping flat billets, the forming machine comprising:
- a storage reservoir for the billets,
- an arrangement of plates, comprising at least two plates according to claim 1, and
- first and second platens adapted to sequentially take and feed the billets from the storage reservoir to the arrangement of plates.

13. The forming machine as claimed in claim 12, wherein the at least two plates are arranged horizontally and adapted to revolve about a vertical axis.

14. The forming machine as claimed in claim 12, wherein the at least two plates are adapted to revolve about a horizontal axis.

15. The forming machine as claimed in claim 12, wherein the first and second platens are adapted to revolve about a slanting axis and rotate alternately by approximately 180°.

\* \* \* \* \*